Patented June 17, 1930

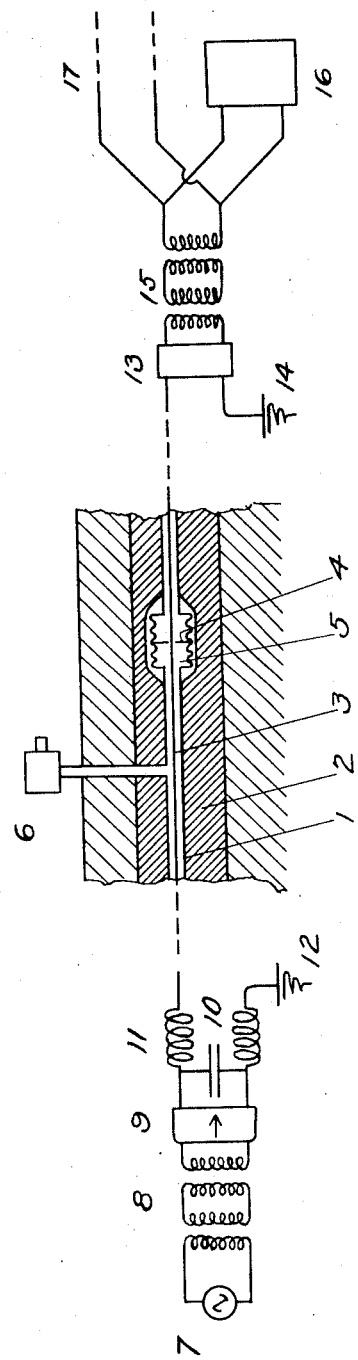

1,764,273

UNITED STATES PATENT OFFICE

ROBERT A. MILLIKAN, OF CHICAGO, ILLINOIS

ELECTRICAL POWER-TRANSMITTING SYSTEM

Application filed July 13, 1921. Serial No. 484,397.

The principal object of my invention is to provide a new and improved system of electrical power transmission. Another object of my invention is to provide a power transmission line adapted for higher voltages than have heretofore been employed, by which notable economy may be effected in the use of copper or other conductor material. I have determined that by special treatment of the conductor and the walls of a conduit surrounding it but spaced therefrom, and by the production of an extreme vacuum within the conduit, it becomes practicable to transmit electricity at enormous voltages without substantial leakage or breakdown.

In the accompanying drawing I have shown a diagram illustrating one example of a system according to my invention and in the following specification I shall describe that example somewhat specifically, leaving the scope of the invention for definition in the appended claims.

The present limit of voltage on open wire transmission lines in the driest climates, which are the most favorable, is 220,000 volts or perhaps a little higher. In such a case a period of wet weather occasions considerable leakage loss. To transmit power of several hundred thousand kilowatts at this voltage requires an expensive investment in copper or aluminum for the conductor material. The leakage loss for open wire lines becomes enormous if it is attempted to use higher voltages and by so doing to cut down the copper cost. This loss is primarily due to leakage into the surrounding air and is not remedied by spacing the conductors farther apart.

Removal of the surrounding air by placing the conductor in a conduit and producing an ordinary vacuum in the conduit does not improve the situation, because the leakage may become even greater in an ordinary vacuum than in air at atmospheric pressure.

I have made a careful investigation of the voltages that can be maintained across extremely high vacua and I have determined that it is not sufficient merely to produce an extremely high vacuum, but that the electrode surfaces and the inner surfaces of the walls of the vessel in which the vacuum is produced must be subjected to careful special treatment. This treatment involves heating such electrodes and vessel walls to high temperatures while the evacuation is proceeding, and continuing this treatment for a considerable length of time. After the surfaces of the electrodes or conductors and the vacuum vessel walls have been subjected to such heat treatment they may again be exposed to the air for several hours or days without losing the benefit of the treatment.

Nearly all high tension power transmission lines carry alternating current, largely because of the facility with which the voltage can be stepped up or down inductively by means of transformers. But when it is attempted to transmit a high voltage alternating current over a conductor in a vacuum conduit, the electrostatic capacity effects present an obstacle that is almost, if not quite, prohibitive. In open wire transmission lines, spaced several feet apart, the capacity effect is a serious factor, and between the central conductor and the walls of a conduit of reasonable size it becomes many times worse.

By transmitting direct current, the dielectric around the conductor becomes the seat of a constant electrostatic strain which involves no energy dissipation and no reactance to neutralize the driving force of the applied potential on the line.

To transmit power of the order of say a million kilowatts over a distance such as that from the Colorado River Canyon to Los Angeles, I propose to provide a conduit 1 placed underground in a reenforced concrete or concrete and tile foundation 2. This conduit 1 will have its walls of glass or brass or vitrified porcelain or other material impervious to air, and the conductor 3 which may be of copper and say 5 to 10 millimeters in diameter, the size however depending on the energy to be transmitted, will lie along the axis of the conduit. Spiders 4 of mica, quartz or other material of high dielectric strength will serve to hold the conductor in its proper place in the axis of the conduit. Expansion joints 5 will be provided at proper intervals and mercury diffusion pumps 6 will be placed at points along the line and kept continuously in operation with their intakes connected to draw directly from the conduit. Thus any slight leakage of gas into the conduit or development of gas therein will be constantly removed and an extreme vacuum will be maintained therein.

At the transmitting end of the line the high voltage direct current to be put upon the line may be generated by first generating alternating current at a convenient voltage in the alternator 7, then stepping the voltage up by suitable transformers 8, rectifying the alternating current by means of the rectifier 9, smoothing this if necessary by the shunt condenser 10 and the series inductances 11, and then applying it to the line 3, with a ground return connection at 12. If 7 is an alternator designed to produce a three phase, flat-topped wave, as in a high potential D. C. system recently designed by M. Montford Morrison 10 and 11 may be dispensed with.

At the receiving end the high tension direct current may be passed through a vacuum tube oscillator 13, for example, to ground 14. The alternating current output from the oscillator 13 will be stepped down by appropriate transformers 15 and delivered to the consumption apparatus 16 and power supply circuits 17.

By my invention an enormous saving will be effected in the cost of the copper for the transmission conductor or conductors. By putting the line underground it will be protected from storms and a large class of accidents to which overhead lines are subject. Not only will the first cost be moderate, but the maintenance cost will be low. The mercury diffusion pumps are simple and reliable in operation, and of low cost to build and operate. Their consumption of power is negligible.

I claim:

1. A long distance high tension electrical power transmitting system comprising a conduit, a conductor within said conduit, means for supporting the conductor in the axis of the conduit, the surface of said conductor and the inner surface of the conduit being prepared by heat treatment, said conduit having a high vacuum therein, means to maintain such high vacuum in the conduit, means to apply a high voltage direct current electromotive force at one end of the conductor, and means to utilize an electric current of high voltage at the other end.

2. A long distance high tension electrical power transmitting system comprising a conduit with its inner surfaces prepared by special heat treatment, a conductor supported in the conduit and spaced from its walls and having its surface prepared by heat treatment, continuously operating vacuum pumps connected to the conduit, means to supply high tension direct current at one point of the conductor, and means to utilize such current at another point of the conductor.

3. A long distance high tension electrical power transmitting system comprising a conductor, a conduit enclosing it, mercury diffusion pumps connected to said conduit, means connected to the conductor to generate a high voltage direct electric current therein and means connected to another point of said conductor to utilize such current.

4. The method of transmitting power electrically with high efficiency over a small conductor in a conduit and without capacity reactance, which consists in continually pumping all air and gases away from the space around the conductor within the conduit and sending a high tension direct current over the conductor.

5. The method of transmitting power electrically with high efficiency over a small conductor in a conduit spaced from its inner wall surface which consists in pumping air and gas continually from within said conduit and meanwhile sending direct current through the conductor at a very high voltage.

6. Means to carry a high tension direct electric power current from one place to another at a long distance, comprising a conduit extending between those places and made as nearly impervious to air as practicable, and a conductor supported within said conduit and spaced from its walls, the space around said conductor being a high vacuum, the surface of the conductor and the inside surface of the conduit being denuded of gases by heat treatment thereof.

7. Means to convey power from one place to another at a long distance by a high tension direct electric current, comprising a conductor extending between those places, and a conduit surrounding said conductor and having its inside walls spaced therefrom, the surface of the conductor and the inside surface of the conduit wall being denuded of gases and the space within the conduit being a high vacuum.

8. Means to convey power from one place to another at a long distance by a high tension direct electric current, comprising a conductor extending between those places, a conduit surrounding said conductor and having its inside walls spaced therefrom, the surface of the conductor and the inside surface of the conduit wall being denuded of gases and the space within the conduit being a high vacuum, and means to maintain the said high vacuum during operation of the conductor.

ROBERT A. MILLIKAN.